(12) United States Patent
Rhee (10) Patent No.: US 6,904,447 B2
(45) Date of Patent: Jun. 7, 2005

(54) HIGH SPEED LOW POWER 4-2 COMPRESSOR

(75) Inventor: Young-Chul Rhee, Suwon (KR)

(73) Assignee: Samsung Electronics, Co., Ltd. (KR)

( * ) Notice: Subject to any disclaimer, the term of this patent is extended or adjusted under 35 U.S.C. 154(b) by 486 days.

(21) Appl. No.: 10/023,686

(22) Filed: Dec. 18, 2001

(65) Prior Publication Data

US 2002/0129077 A1 Sep. 12, 2002

(30) Foreign Application Priority Data

Dec. 29, 2000 (KR) .................................. 2000-85542

(51) Int. Cl.$^7$ .............................................. G06F 7/50
(52) U.S. Cl. ................................................... 708/703
(58) Field of Search ............................. 708/703, 709, 708/629

(56) References Cited

U.S. PATENT DOCUMENTS

| | | | | |
|---|---|---|---|---|
| 4,766,565 A | * | 8/1988 | Bechade et al. ............ | 708/703 |
| 4,831,578 A | * | 5/1989 | Bui ............................ | 708/703 |
| 4,839,849 A | * | 6/1989 | Knauer ....................... | 708/703 |
| 4,931,981 A | * | 6/1990 | Knauer ....................... | 708/703 |
| 5,040,139 A | * | 8/1991 | Tran .......................... | 708/628 |
| 5,151,875 A | * | 9/1992 | Sato ........................... | 708/702 |
| 5,694,061 A | * | 12/1997 | Morosawa et al. ......... | 326/119 |
| 5,805,491 A | * | 9/1998 | Bechade ..................... | 708/629 |
| 5,818,747 A | * | 10/1998 | Wong ......................... | 708/703 |
| 6,043,675 A | * | 3/2000 | Miyamoto .................. | 326/36 |
| 6,505,226 B1 | * | 1/2003 | Ahn ........................... | 708/703 |
| 6,535,902 B2 | * | 3/2003 | Goto .......................... | 708/629 |

FOREIGN PATENT DOCUMENTS

| | | | |
|---|---|---|---|
| EP | 0 827 069 A2 | 4/1998 | ............ G06F/7/50 |
| GB | 2 223 112 A | 3/1990 | ............ G06F/7/48 |

OTHER PUBLICATIONS

"Design of High–Speed Low–Power 3–2 Counter and 4–2 Compressor for Fast Multipliers", Hsiao, et al., Electronics Letters, Feb. 19, 1998, vol. 34 No. 4, pp. 341–343.

* cited by examiner

Primary Examiner—Tan V. Mai
(74) Attorney, Agent, or Firm—Mills & Onello LLP (57) ABSTRACT

A high speed low powered 4-2 compressor according to the present invention performs an XOR/XNOR operation of input data by using a single input type NAND/NOR logic circuit and a dual input type NAND/NOR logic circuit. Thus, delays to generate complementary signals are avoided. In addition, the 4-2 compressor uses a single railed multiplexer instead of a dual railed multiplexer, so that gate drive nodes and internal load capacitance are reduced. As a result, circuit area and power consumption of the 4-2 compressor are reduced.

24 Claims, 9 Drawing Sheets

Fig. 1

(Prior Art)

Fig. 2

(Prior Art)

HIGH SPEED LOW POWER 4-2 COMPRESSOR

This application relies for priority upon Korean Patent Application No. 2000-85542, filed on Dec. 29, 2000, the contents of which are herein incorporated by reference in their entirety.

FIELD OF THE INVENTION

The present invention generally relates to a logic circuit and, more particularly, to a 4-2 compressor for a multiplier.

BACKGROUND OF THE INVENTION

Multiplication is one of the primary operations in general-purpose microprocessors and special purpose digital signal processors. The speed of the multiplication operation often directly determines how fast the processors are capable of operating. Generally, a multiplier generates plural partial summation results and then sums the partial results to compute a product. The summation performance influences the performance of the multiplier. However, as technology progresses a user demands increasingly fast data processing systems. To satisfy the demand, the multiplier circuit grows in complexity, and, as a result, the multiplier occupies an increasingly larger area of a central processing unit (CPU) to be embedded in the data processing system. Referring to "IEEE-754 Floating Point specification", which can be downloaded from the web site http://standards.ieee.org/, contemporary multipliers must be capable of performing a multiplication operation for 54 bits of input data. Thus, a significant amount of circuit area is required to implement a multiplier for input data of large bit width To improve the performance of the multiplier, several techniques have been developed. Generally, multipliers with the desired capability have array structures or Wallace tree structures. A fast array multiplier performing fast multiplication is composed of a Booth encoder, a partial-product summation tree (PPST), and a final adder. The PPST is responsible for a significant portion of the total multiplication operation delay, and is implemented commonly by a Wallace tree with 3-2 counters (i.e., full adders) and 4-2 compressors (i.e., half adders) as basic cells. Hence, design of these counters and the compressors will be a significant factor for improving the performance of the multiplier. The structure of the 4-2 compressor is as follows.

Figure 1:
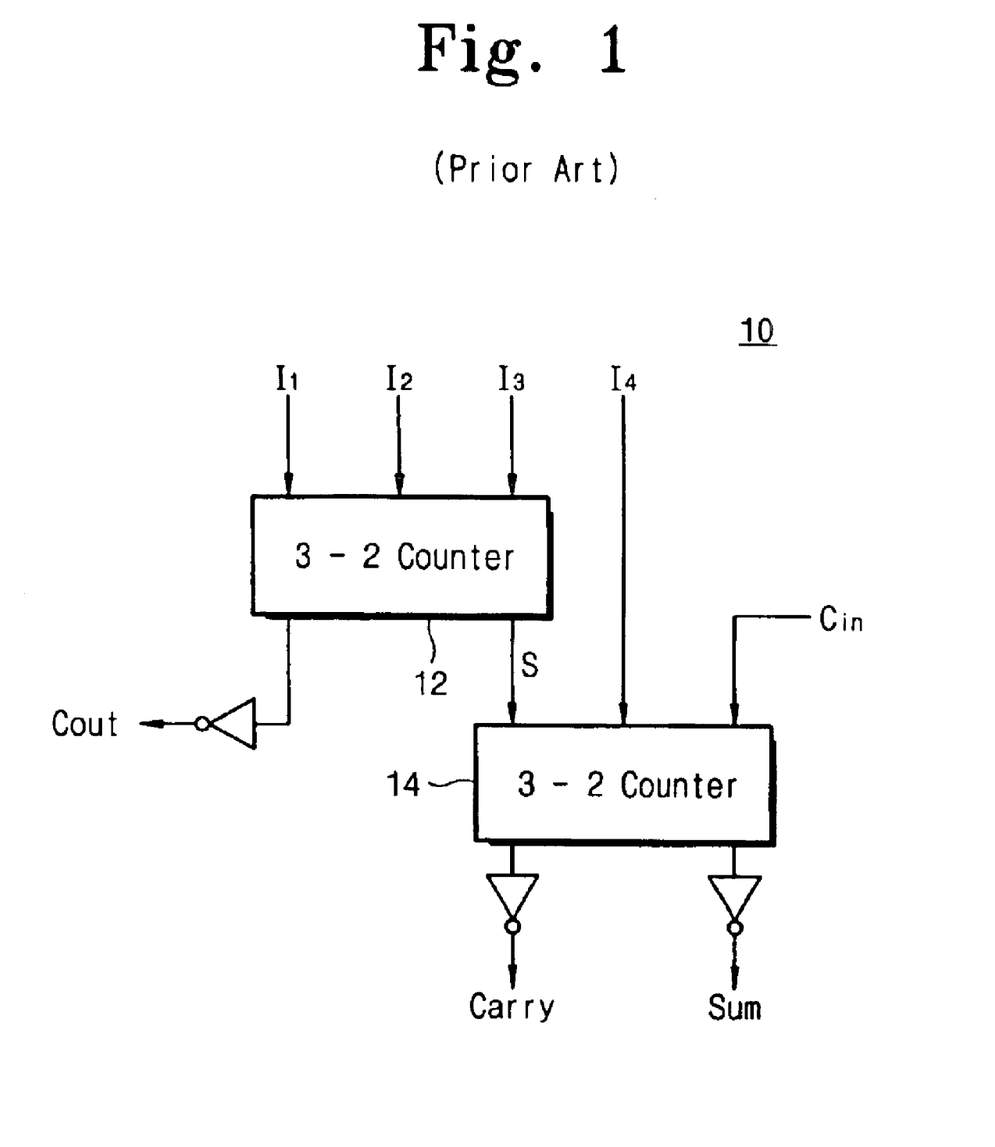
FIG. 1 is a block diagram for illustrating a conventional 4-2 compressor using 3-2 counters.

FIG. 1 is a block diagram for illustrating a conventional 4-2 compressor 10. The 4-2 compressor 10 is described in "Design of high-speed low-power 3-2 counter and 4-2 compressor for fast multipliers", by Shen-Fu Hsiao etc., Feb. 19, 1998, ELECTRONICS LETTERS, Vol. 34, No. 4, pp. 341–343. The 4-2 compressor 10 can be found in FIG. 3a of the paper.

Referring to FIG. 1, the 4-2 compressor 10 is composed of two cascaded 3-2 counters 12 and 14. Each 3-2 counter can be realized using two multiplexers. When four input data I1, I2, I3 and I4 are externally input to the 4-2 compressor 10, the first 3-2 counter 12 generates a carry-out bit Cout and a sum bit S in response to the three input data I1, I2 and I3. The carry-out bit Cout is output to a 4-2 compressor at the next stage (not shown) connected to the current 4-2 compressor 10, and the sum bit S is output to the second 3-2 counter 14, respectively. The second 3-2 counter 14 generates a carry bit Carry and a sum bit Sum as final outputs, in response to the sum bit S, the input data I4, and a carry-input bit Cin from a previous 4-2 compressor at a previous stage (not shown). As described above, the compressor 10 receives the four input data I1, I2, I3 and I4, and generates two final outputs Carry and Sum. Therefore, the compressor 10 is referred to as a "4-2 compressor". In the 4-2 compressor 10, four multiplexers are used. On the assumption that the delay required for one of the multiplexers is 1 MUX, then it follows that the 4-2 compressor 10 requires 4 MUXs of delay.

Figure 2:
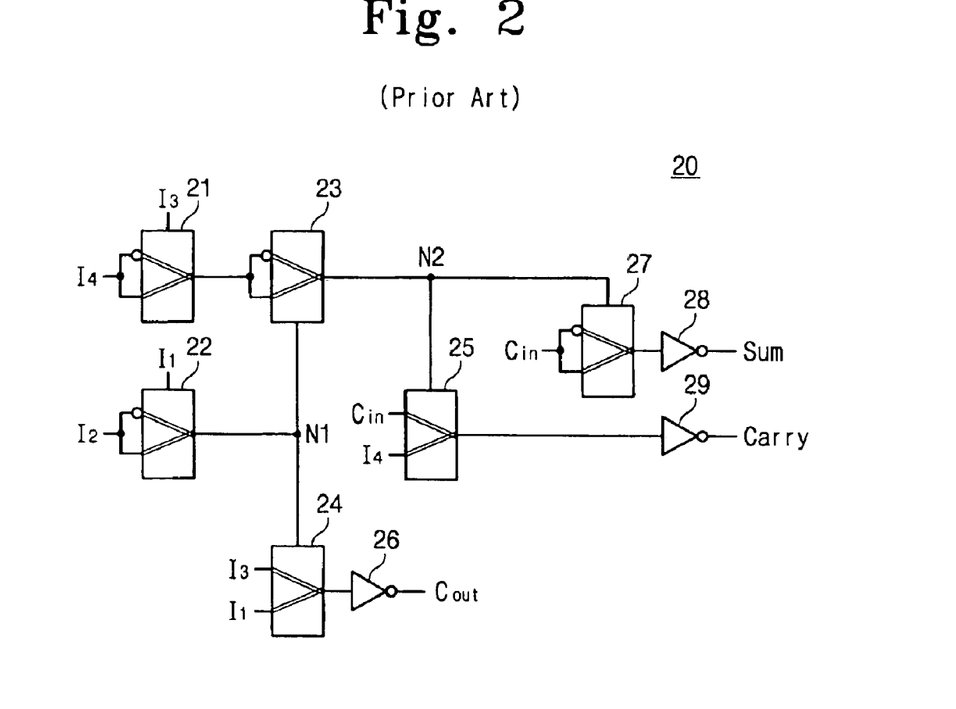
FIG. 2 is a circuit diagram for illustrating a conventional DPL 4-2 compressor.
Figure 3:
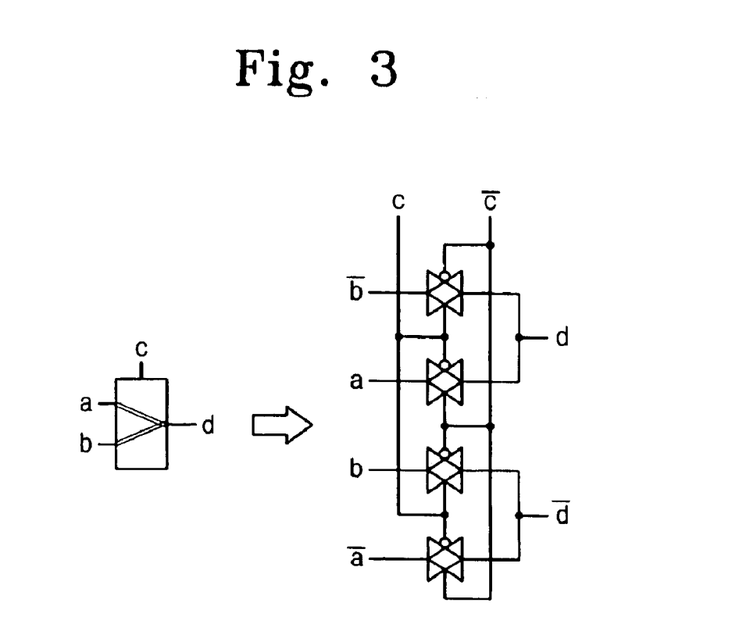
FIG. 3 is a detailed circuit diagram for illustrating a dual railed multiplexer shown in FIG. 2.

FIG. 2 is a circuit diagram for illustrating a conventional double-pass transistor-logic (DPL) 4-2 compressor 20 to reduce the delay of the 4-2 compressor 10, and FIG. 3 is a detailed circuit diagram for illustrating a dual-railed multiplexer shown in FIG. 2. The DPL 4-2 compressor 20 is described in FIG. 3b of the Hsiao paper cited above. Referring to FIGS. 2 and 3, the 4-2 compressor 20 reduces the delay from 4 MUXs to 3 MUXs, through the use of pass-transistor multiplexers (PTMs) 21–25 and 27 composed of CMOS transmission gates (TGs). The detailed structure of the 4-2 compressor 20 is as follows.

The 4-2 compressor 20 generates two carry bits Cout and Carry, and a sum bit Sum, in response to externally input four input data I1, I2, I3 and I4, and a carry-input bit Cin from the previous 4-2 compressor (not shown). The 4-2 compressor 20 is constructed with dual rails being suitable for high speed operation. The 4-2 compressor 20 is referred to as a double-pass transistor-logic (DPL) 4-2 compressor.

At two internal nodes N1 and N2, the 4-2 compressor 20 has eight gates to be driven by the output of the pass-transistor multiplexers (PTMs) composed of CMOS transmission gates (TGs). For example, on the assumption that an internal load capacitance of a P-channel MOS transistor is Cgp and an internal load capacitance of a N-channel MOS transistor is Cgn, the internal load capacitance at the node N2 is 4Cgp+4Cgn, and the internal load capacitance at the node N2 is 4Cgp+4Cgn, respectively. In this case, the total internal load capacitance of the 4-2 compressor 20 becomes 8Cgp+8Cgn. Generally, the PMOS transistor is twice the size of the NMOS transistor. Thus, the internal load capacitance is doubled, which is expressed as 1Cgp≈2Cgn. Therefore, the total internal load capacitance of the 4-2 compressor 20 can be expressed as 24Cgn by converting it on the basis of the NMOS transistor.

Generally, pass-transistor logic is used for transmitting a source instead of driving gates. Thus, it is difficult for the 4-2 compressor 20 to show low-power and high-speed performance of the pass-transistor logic, and moreover, the power consumption and the area of the 4-2 compressor 20 increase in proportion to the increment of wiring based on the dual railed structure.

Figure 4:
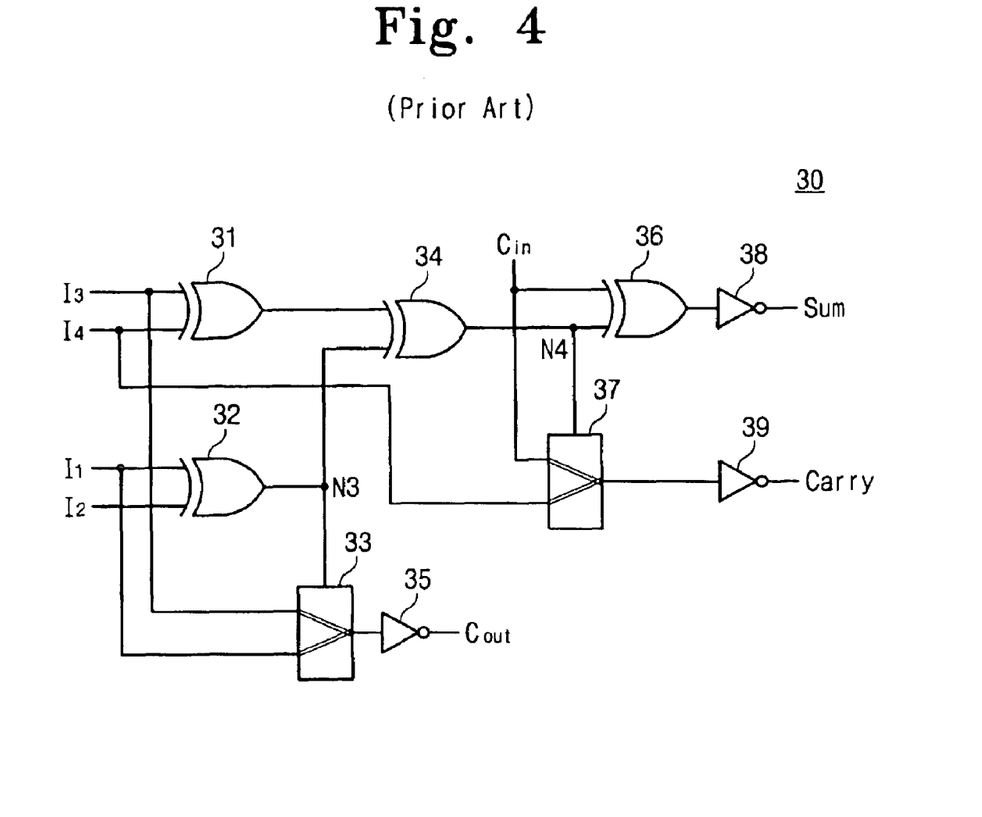
FIG. 4 is a circuit diagram for illustrating a conventional RIC 4-2 compressor.
Figure 5:
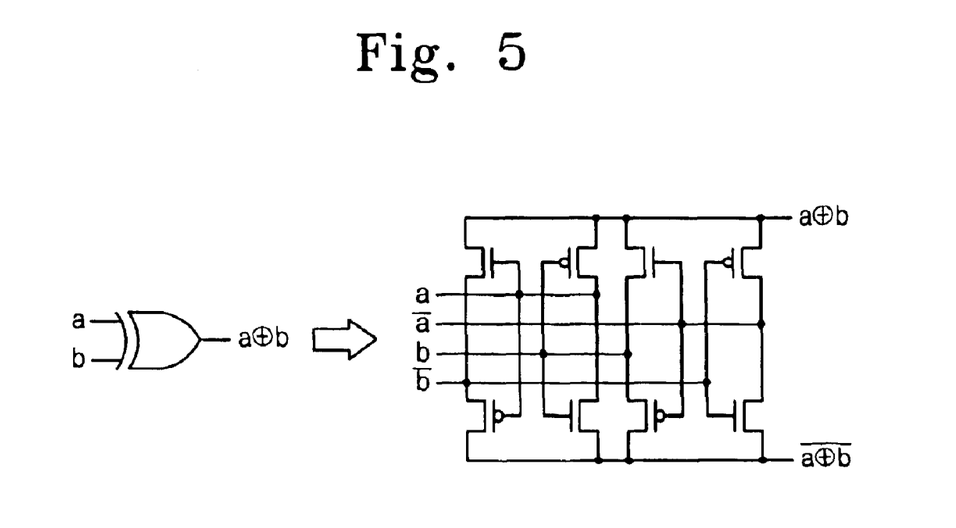
FIG. 5 is a detailed circuit diagram for illustrating an XOR/XNOR logic shown in FIG. 4.

To solve these problems, a reduced internal capacitance (RIC) 4-2 compressor 30 is used, as illustrated in FIG. 4, which is described with reference to FIG. 3c of the Hsiao paper cited above. FIG. 5 is a detailed circuit diagram for illustrating an XOR/XNOR logic element shown in FIG. 4. Referring to FIGS. 4 and 5, the 4-2 compressor 30 comprises multiplexers 33 and 37 composed of transmission gates, and XOR/XNOR logic elements 31, 32, 34 and 36. The multiplexers 33 and 37 are coupled to output ports of carry bits Cout and Carry, and the XOR/XNOR logic elements 31, 32, 34 and 36 are used for generating a sum bit Sum. Each of nodes N3 and N4 of the 4-3 compressor 30 has the internal load capacitance of 3Cgp+3Cgn. Thus, a total internal load capacitance of the 4-2 compressor 30 becomes 6Cgp+6Cgn. The total internal load capacitance can be expressed as 18Cgn by converting it on the basis of the NMOS transistor. This 4-2 compressor 30 is referred to as a reduced-internal-capacitance (RIC) 4-2 compressor.

However, the nodes N3 and N4 are used for driving gates of the multiplexers 33 and 37, and used as sources of the XOR/XNOR logic elements 31, 32, 34 and 36, so that the driving gate capacity is relatively decreased. In other words, the capability of driving gates is decreased, although the amount of the internal load capacitance is reduced. Thus the efficiency of the operating time of the RIC 4-2 compressor 30 is inferior to the DPL 4-2 compressor 20. In addition, the power consumption and the area of the RIC 4-2 compressor 30 are increased in proportion to increment of wiring based on the dual-railed structure.

SUMMARY OF THE INVENTION

It is therefore an object of the present invention to provide a high-speed low-power 4-2 compressor by reducing the total internal load capacitance and reducing the circuit area and power consumption of the 4-2 compressor.

In order to attain the above objects, according to an aspect of the present invention, there is provided a 4-2 compressor generating a sum bit and a carry bit as a function of four input data comprising: a first logic circuit for performing a NAND operation and a NOR operation of first and second input data, generating an XOR/XNOR operation result of the first and second input data by using the NAND and NOR results, and generating a carry-out bit to a next stage by selecting either the NAND operation result or the NOR operation result; a second logic circuit for generating a selection signal in response to a third input data, a fourth input data and the XOR/XNOR operation result from the first logic circuit; a third logic circuit for generating the sum bit by selecting either a carry-input bit or an inverted carry-input bit in response to the selection signal from the second logic circuit; and a fourth logic circuit for generating the carry bit by selecting either the inverted carry-input bit or an inverted fourth data in response to the selection signal from the second logic circuit.

In a preferred embodiment, the first logic circuit comprises: a first XOR/XNOR logic circuit for performing the NAND operation and the NOR operation, respectively, and for generating the XOR/XNOR operation result by using the NAND and NOR operation results; and a first multiplexer for generating the carry-out bit for the following stage by selecting either the NAND operation result or the NOR operation result in response to an inverted third data, wherein the first multiplexer is a single railed multiplexer.

The second logic circuit preferably comprises: a second XOR/XNOR logic circuit for performing a NAND operation and a NOR operation of the third input data and fourth input data, and for generating an XOR/XNOR operation result of the third and fourth input data by using the NAND and NOR operation results; and a second multiplexer for generating the selection signal by selecting either the XOR operation result or the XNOR operation result from the first XOR/XNOR logic circuit, in response to the XOR/XNOR operation result from the second XOR/XNOR logic circuit, wherein the second multiplexer is a dual railed multiplexer.

The third logic circuit preferably comprises a third multiplexer for generating the sum bit, by selecting one of the carry-input bit and the inverted carry-input bit, in response to the selection signal from the second multiplexer, wherein the third multiplexer is a single railed multiplexer.

The fourth logic circuit preferably comprises a fourth multiplexer for generating the carry bit, by selecting one of the inverted fourth input data and the inverted carry-input bit, in response to the selection signal from the second multiplexer, wherein the fourth multiplexer is a single railed multiplexer.

Each XOR/XNOR logic circuit may comprise: a NAND gate for performing the NAND operation of a first input data and the second input data; a NOR gate for performing the NOR operation of a second input data and the first input data; an XNOR means for generating an XNOR result of the first and the second input data in response to the outputs of the NOR gate and the NAND gate; and an XOR means for generating an XOR result of the first and the second input data in response to the outputs of the NOR gate and the NAND gate.

The XNOR means may comprise: a first inverter for inverting the output from the NAND gate while the output of the NOR gate is a first logic state, and outputting the output from the NAND gate without inverting while the output of the NOR gate is a second logic state; and a first full-swing means for making full-swing the output of the first inverter.

The XOR means may comprise: a second inverter for inverting the output from the NOR gate while the output of the NAND gate is the second logic state, and outputting the output from the NAND gate without inverting while the output of the NOR gate is a second logic state; and a second full-swing means for making full-swing the output of the second inverter.

The first inverter may comprise a P type transistor and a N type transistor having a current path between a power supply voltage source and an output port of the NOR gate in series, and a control electrode controlled by the first input data 'a'. The first full-swing means may comprise a P type transistor having a current path between an output port of the first inverter and the output port of the NOR gate, and control electrode controlled by the first input data 'a'. The first full-swing means may be turned on when the output signal of the NOR gate is the second logic level, and increases the voltage level of the output signal of the first inverter as high as the power supply voltage level.

The second inverter may comprise a P type transistor and a N type transistor having a current path between a ground voltage source and an output port of the NAND gate in series, and a control electrode controlled by the output of the NOR gate. The second full-swing means may comprise a N type transistor having a current path between an output port of the second inverter and the output port of the NAND gate, and control electrode controlled by the first input data 'a'. The second full-swing means is preferably turned on when the output signal of the NAND gate is the first logic level, and decreases the voltage level of the output signal of the second inverter as low as the ground voltage level.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 6:
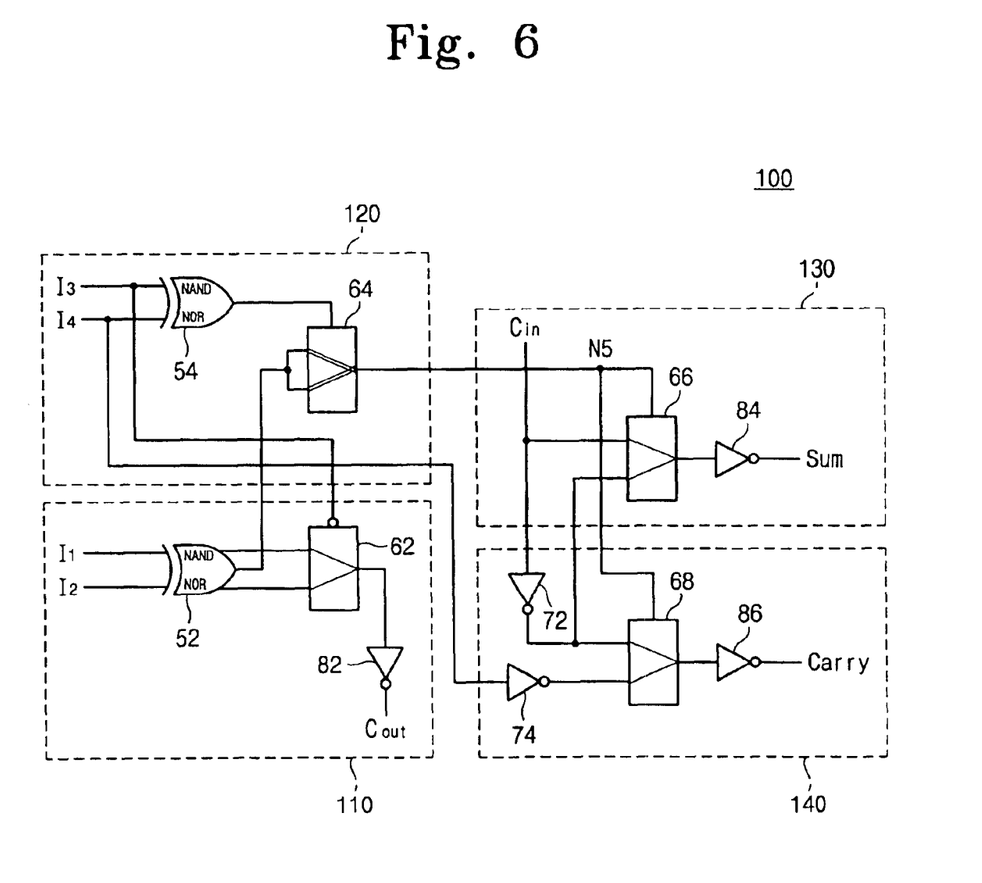
FIG. 6 is a circuit diagram for illustrating a 4-2 compressor according to the preferred embodiment of the present invention.
Figure 7A:
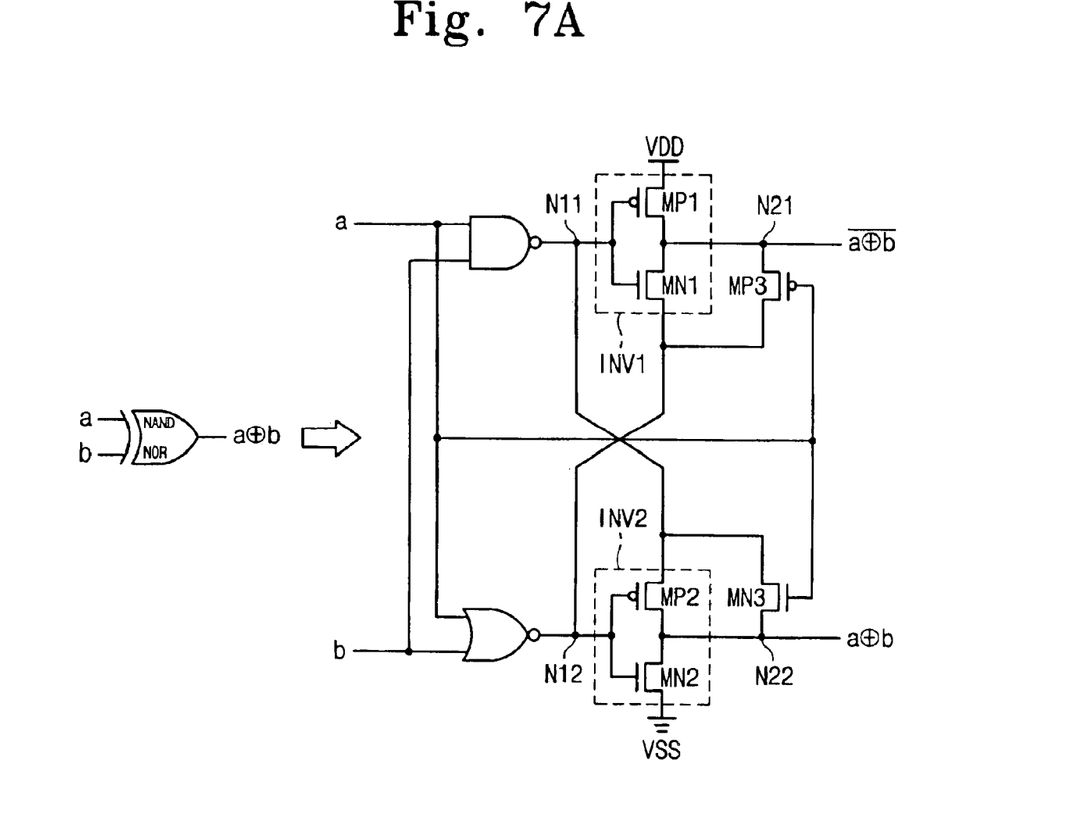
FIG. 7A is a detailed circuit diagram for illustrating an XOR/XNOR logic element using NAND/NOR logic elements to generate an XOR/XNOR result, shown in FIG. 6.
Figure 7B:
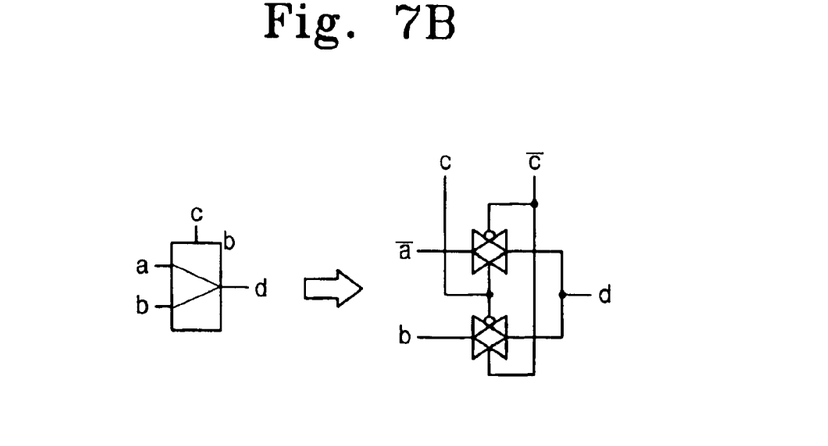
FIG. 7B is a detailed circuit diagram for illustrating a single railed multiplexer shown in FIG. 6.

FIG. 6 is a circuit diagram for illustrating a 4-2 compressor 100 according to a preferred embodiment of the present invention. FIG. 7A is a detailed circuit diagram for illustrating an XOR/XNOR logic circuit shown in FIG. 6, and FIG. 7B is a detailed circuit diagram for illustrating a single railed multiplexer shown in FIG. 6.

Referring first to FIG. 6, the 4-2 compressor 100 comprises four logic circuits 110, 120, 130 and 140. The first logic circuit 110 generates a NAND/NOR result of externally input first and second data I1 and I2, and an XOR/XNOR result by using the NAND/NOR result, and generates a carry-out bit Cout in response to the NAND/NOR result. The second logic circuit 120 generates a selection signal, in response to the NAND/NOR results from the first logic circuit 110 and externally input third and fourth input data I3 and I4. The third logic circuit 130 generates a sum bit Sum by selecting either a carry-input bit Cin from a previous stage or an inverted carry-input bit $\overline{Cin}$, in response to the selection signal from the second logic circuit 120. The fourth logic circuit 140 generates a carry bit Carry by selecting either the inverted carry-input bit $\overline{Cin}$ or an inverted fourth input data $\overline{I4}$, in response to the selection signal from the second logic circuit 120. The structures of the logic circuits are described as follows.

The first logic circuit 110 includes a first XOR/XNOR logic element 52 and a single railed first multiplexer 62. The first XOR/XNOR logic element 52 generates a NAND/NOR result of the first and second data I1 and I2, and an XOR/XNOR result by using the NAND/NOR result. The first multiplexer 62 generates a carry-out bit Cout by selecting either the NAND result or the NOR result from the first XOR/XNOR logic circuit 52, in response to the inverted third data $\overline{I3}$.

The second logic circuit 120 includes a second XOR/XNOR logic element 54 and a dual railed second multiplexer 64. The second XOR/XNOR logic element 54 generates an XOR/XNOR result by using a NAND/NOR result of the third and fourth data I3 and I4. The second multiplexer 64 outputs the XOR/XNOR result from the first XOR/XNOR logic element 52, in response to the XOR/XNOR result from the second XOR/XNOR logic element 54. The XOR/XNOR result from the second multiplexer 64 is used as a selection signal to output the sum bit Sum and the carry bit Carry of the 4-2 compressor 100.

The third logic circuit 130 includes a single railed third multiplexer 66, which receives the carry-input bit Cin from the previous stage and an inverted carry-input bit $\overline{Cin}$ and generates the sum bit Sum in response to the output of the second multiplexer 64.

The fourth logic circuit 140 includes a single railed fourth multiplexer 68, which receives the inverted carry-input bit $\overline{Cin}$ and the inverted fourth data $\overline{I4}$ and generates the carry bit Carry in response to the output of the second multiplexer 64.

The externally input carry-input bit Cin and the fourth data I4 are inverted through inverters 72 and 74, respectively. This inversion is used for generating an inversion signal required by the single railed multiplexers 66 and 68. The sum bit Sum and carry bits Cout and Carry are output through buffers 84, 82 and 86 coupled to the multiplexers 66, 62 and 68, respectively.

As shown in FIG. 6, the XOR/XNOR logic elements 52 and 54 using the NAND/NOR logic elements to obtain XOR/XNOR results are used at an input stage of the 4-2 compressor 100. Each of the XOR/XNOR logic elements 52 and 54 adopts a single input manner and a dual input manner, so that the XOR/XNOR logic elements 52 and 54 do not require an inverter for generating an inversion signal. As a result, a delay originated from the inverter can be prevented.

In addition, the 4-2 compressor 100 uses the single railed multiplexers to limit the resulting circuit area and the power consumption of the 4-2 compressor. In this case, the 4-2 compressor 100 uses the outputs of the XOR/XNOR logic circuits 52 and 54 as a source. Thus, the 4-2 compressor 100 does not require two nodes N1 and N2 of FIG. 2, or N3 and N4 of FIG. 4, but requires only one node N5. As a result, the gate drive at the node N5 has only 2Cgp+2Cgn of internal load capacitance. The internal load capacitance can be expressed as 6Cgn by converting it on the basis of the NMOS transistor. It is reduced in internal load capacitance by 18Cgn, as compared to the conventional DPL 4-2 compressor 20 shown in FIG. 2, and is reduced by 12Cgn, as compared to the conventional RIC 4-2 compressor 30 shown in FIG. 4.

Referring to FIG. 7A, each of the XOR/XNOR logic elements 52 and 54 is composed of a NAND gate, a NOR gate, inverters INV1 and INV2 for inverting the output signal of the NAND gate and the NOR gate, and full-swing transistors MP3 and MN3 for making full swing, the output of the inverters INV1 and INV2.

The NAND gate includes a first input port for receiving a first input data 'a', and a second input port. The NOR gate includes a third input port coupled to the first input port of the NAND gate to receive the first input data 'a', and a fourth input port to receive the second input data 'b'. The second input port of the NAND gate receive the second input data 'b', and is coupled to the fourth input port of the NOR gate.

Each of output nodes N11 and N12 of the NAND gate and the NOR gate is coupled to the first inverter INV1 and the second inverter INV2. The first inverter INV1 is composed of a first PMOS transistor MP1 and a first NMOS transistor MN1. Each of the transistors MP1 and MN1 includes a current path shaped between a power supply voltage source $V_{DD}$ and the output node N12 in series, and a gate controlled by the output of the NAND gate. The second inverter INV2 is composed of a second PMOS transistor MP2 and a second NMOS transistor MN2. Each of the transistors MP2 and MN2 includes a current path shaped between a ground voltage source $V_{SS}$ and the output node N11 in series, and a gate controlled by the output of the NOR gate.

To output nodes N21 and N22 of the inverters INV1 and INV2, a third PMOS transistor MP3 and a third NMOS transistor MN3 is coupled, respectively, to make full swing, the output signal from the output nodes N11 and N12. Briefly, the PMOS transistor MP3 includes a drain coupled to the output node N12 of the NOR gate, a source coupled to the output node N21 of the first inverter INV1, and a gate controlled by the first input data 'a'. The NMOS transistor MN3 includes a drain coupled to the output node N11 of the NAND gate, a source coupled to the output node N22 of the second inverter INV2, and a gate controlled by the first input data 'a'. Operation of the XOR/XNOR logic circuit 52 and 54 using the NAND/NOR result to generate the XOR/XNOR result is described as follows.

First, when two data I1 and I2 or I3 and I4 (i.e., 'a' and 'b') are input from an external source, the NAND gate and the NOR gate included in each of the XOR/XNOR logic circuits 52 and 54 each executes the NAND operation and the NOR operation, respectively. The NAND operation result and the NOR operation result are input to the first inverter INV1 and the second inverter INV2, respectively.

The first inverter INV1 generates an XNOR result of the input data 'a' and 'b' (i,e., $\overline{a \oplus b}$) by inversing the output signal of the NAND gate while the output signal of the NOR gate is a logic low level, and outputting the output signal of the NAND gate without inversion while the output signal of the NOR gate is a logic high level. The second inverter INV2 generates an XOR result of the input data 'a' and 'b' (i,e., $a \oplus b$) by inversing the output signal of the NOR gate while the output signal of the NAND gate is a logic high level, and outputting the output signal of the NOR gate without inversion while the output signal of the NAND gate is a logic low level.

However, the first inverter INV1 receiving the output signal of the NAND gate generates an output signal with $V_{DD}$-Vtn voltage level when both the output signals of the NAND gate and the NOR gate are logic high levels. The output of the first inverter INV1 is reduced by a threshold voltage Vtn of the MOS transistor MN1, so that the output signal is not fully swung. At this time, the third PMOS transistor MP3 coupled in parallel to the first NMOS transistor MN1 of the first inverter INV1, is turned on. Thus, the transistor MP3 charges on the output signal of the XOR/XNOR logic circuit 52 or 54. According to the charging operation of the third PMOS transistor MP3, the XOR/XNOR logic element 52 or 54 can output the complete high voltage $V_{DD}$.

The second inverter INV2 receiving the output signal of the NOR gate generates an output signal having Vtp voltage level when both the output signals of the NAND gate and the NOR gate are logic low levels. The output of the second inverter INV2 is increased by a threshold voltage Vtp of the MOS transistor MP2, so that the output signal is not fully swung. At this time, the third NMOS transistor MN3 coupled in parallel to the second PMOS transistor MP2 of the second inverter INV2, is turned on. Thus, the transistor MN3 is discharged. According to the discharging operation of the third NMOS transistor MN3, the XOR/XNOR logic element 52 or 54 can output the complete low voltage Vss.

As a result, the inverters INV1 and INV2 generate an XNOR result (i.e., $\overline{a \oplus b}$) and an XOR result (i.e., $a \oplus b$) of the input data I1 and I2, or I3 and I4 (i.e., 'a' and 'b') of the NAND gate and the NOR gate, respectively, without fluctuation of the voltage originated from the threshold voltage of the transistor included in the inverters INV1 and INV2.

Figure 8:
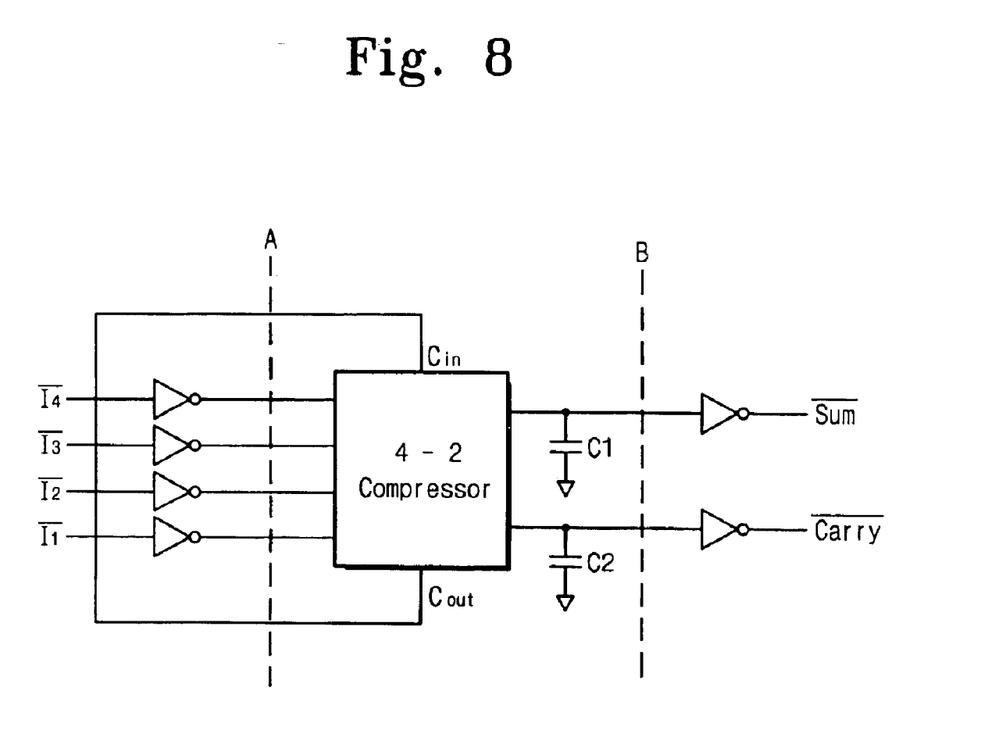
FIG. 8 is a circuit diagram for illustrating a simulation environment of the 4-2 compressor.

Referring again to FIG. 6, the XOR/XNOR results $\overline{a \oplus b}/a \oplus b$ are input to the second multiplexer 64, and are used as a source and a gate of the CMOS transmission gates. The NAND result and the NOR result of the first XOR/XNOR logic circuit 52 are input to the first multiplexer 62, and are output as a carry-out bit Cout. The output signal of the second multiplexer 64 is input to the single railed multiplexers 66 and 68, with a carry-input bit Cin from the previous stage, for generating the sum bit Sum and the carry bit Carry. With reference to FIG. 8, the performance of the 4-2 compressor 100 as compared to the performance of the conventional 4-2 compressors 20 and 30 in the same simulation environment, will now be discussed.

FIG. 8 is a circuit diagram for illustrating a simulation environment of the 4-2 compressor. Referring to FIG. 8, the 4-2 compressor 20, 30 or 100 is located between marks of 'A' and 'B'. Input data $\overline{I1}, \overline{I2}, \overline{I3}$ and $\overline{I4}$ are input though four buffers, output data $\overline{Sum}$ and $\overline{Carry}$ are observed through two buffers, respectively. Where, load capacitors $C_L$ marked as C1 and C2 are coupled to output ports of the 4-2 compressor. The delay, and the power consumption of the 4-2 compressors, and the multiplication result of the delay and the power consumption are measured through the load capacitors C1 and C2. The 4-2 compressors 20, 30 and 100 adopt a 0.18 µm CMOS design rule, and use 1.8V as a power supply voltage $V_{DD}$. In the simulation, an input frequency is 50 MHz, an input slop is 0.2 ns, and a temperature is 25° C., respectively.

Figure 9:
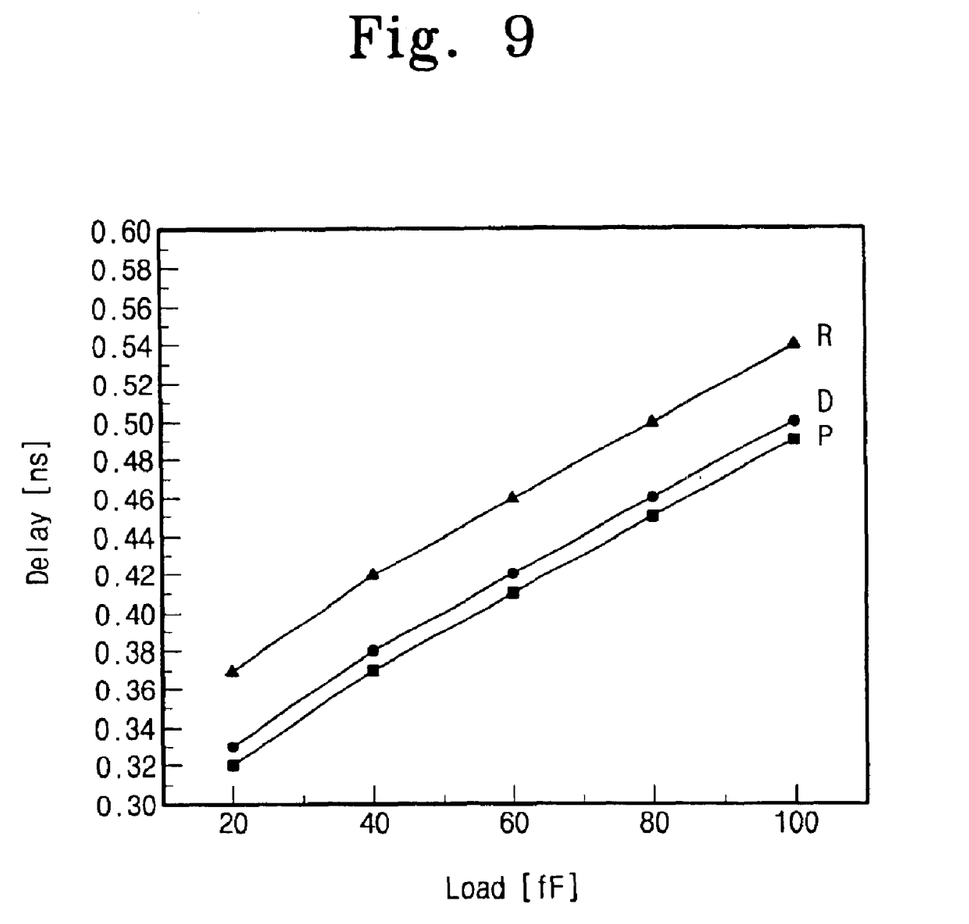
FIGS. 9 to 11 are charts for illustrating simulation results related to delay and power consumption, and a multiplication result of the delay and power consumption of the 4-2 compressors shown in FIGS. 2, 4 and 6, respectively, under the simulation environment shown in FIG. 8.
Figure 10:
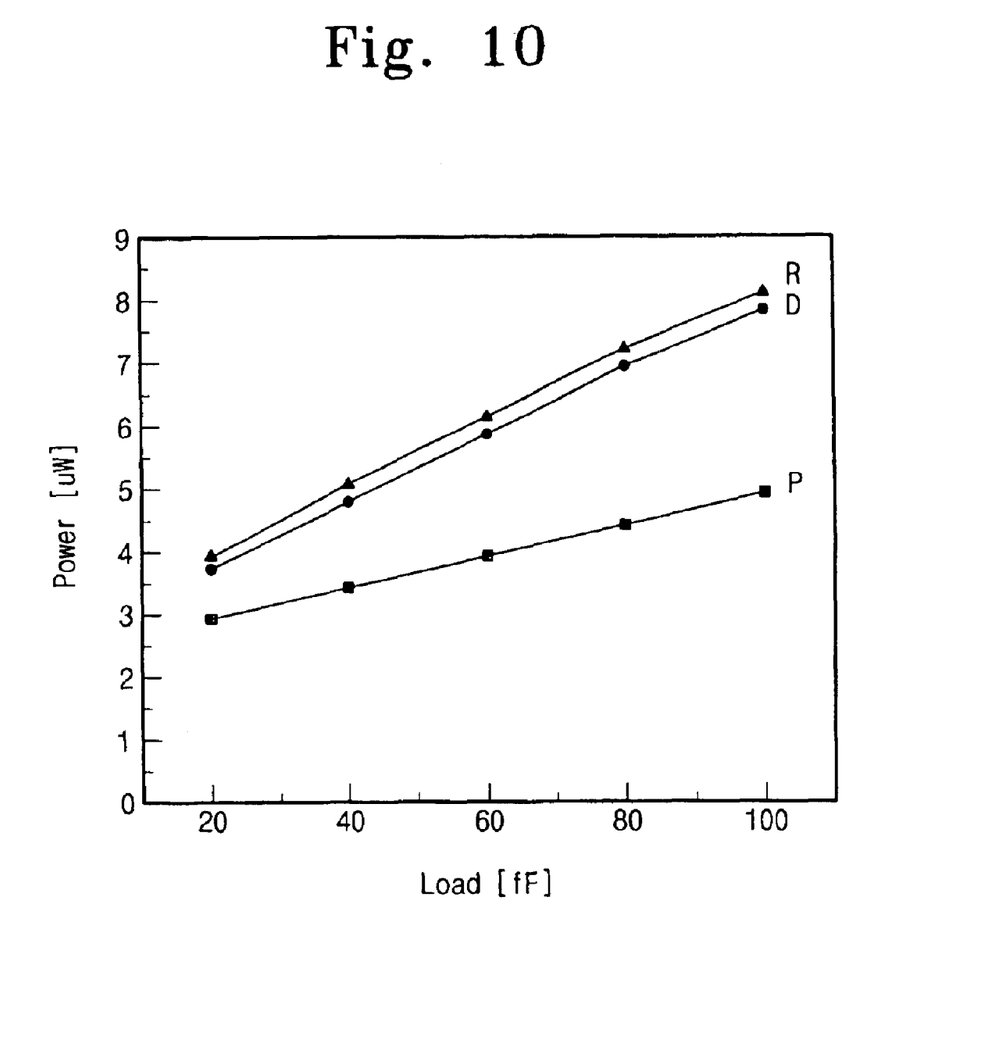
Figure 11:
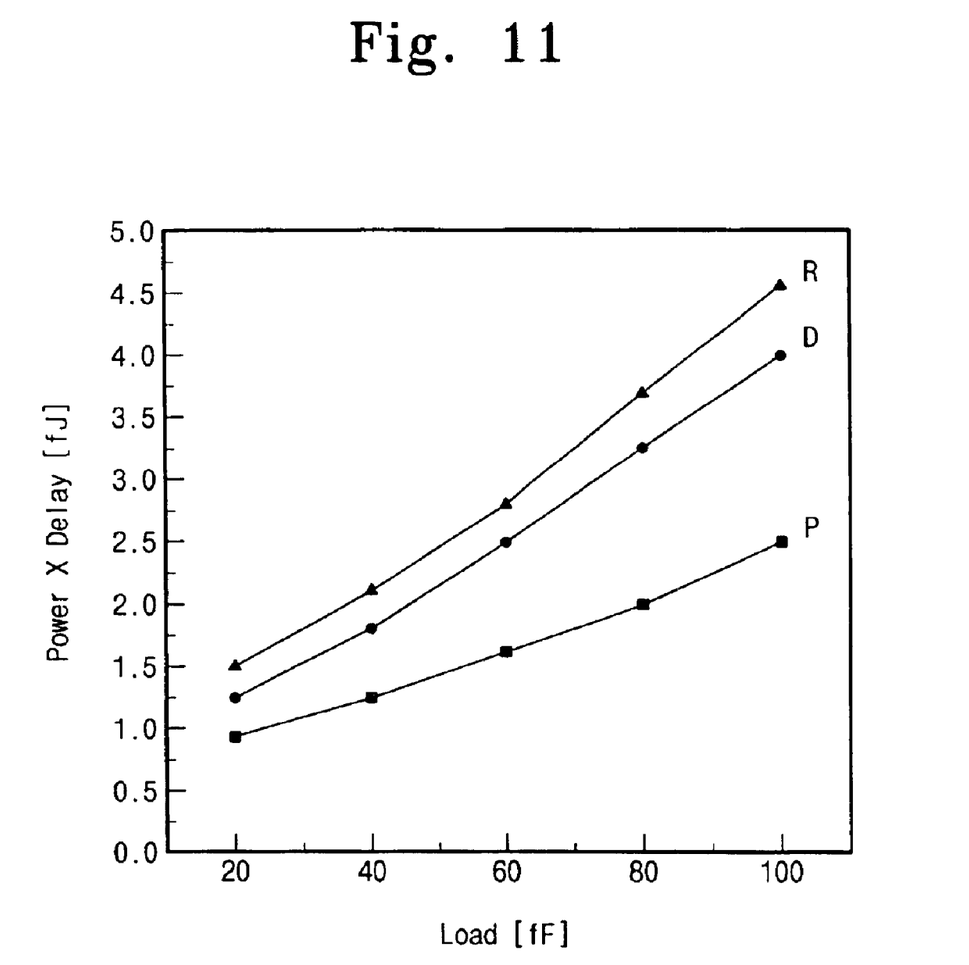

FIGS. 9 through 11 are charts for illustrating simulation results related to delay, power consumption, and multiplication result of the delay and the power consumption of the 4-2 compressors 20, 30 and 100 shown in FIGS. 2, 4 and 6, respectively, under the simulation environment shown in FIG. 8. In FIGS. 9 through 11, a simulation result of the DPL 4-2 compressor 20 shown in FIG. 2 is marked as 'D', a simulation result of the RIC 4-2 compressor 30 shown in FIG. 4 is marked as 'R', and a simulation result of the 4-2 compressor 100 according to the present invention shown in FIG. 6 is marked as 'P', respectively.

Referring to FIGS. 9 through 11, it can be determined that the delay, the power consumption, and the multiplication result of the delay and the power consumption of the 4-2 compressor 100 according to the present invention shown in FIG. 6 are reduced remarkably, as compared to the conventional 4-2 compressors 20 and 30.

Simulation results shown in FIGS. 9 through 11 are expressed below with reference to Table 1 and Table 2. Table 1 shows the simulation results of the DPL compressor 20 and the 4-2 compressor 100. Table 2 shows the simulation results of the RIC compressor 30 and the compressor 100. In Table 1 and Table 2, the numbers expressed in round brackets show normalized simulation results based on the simulation results of the conventional 4-2 compressors 20 and 30.

TABLE 1

| $C_L$ [pF] | Conventional DPL 4-2 compressor | | | Proposed 4-2 compressor | | |
|---|---|---|---|---|---|---|
| | Delay [ns] | Power [µW] | Delay × Power [fJ] | Delay [ns] | Power [µW] | Delay × Power [fJ] |
| 0.02 | 0.33 | 3.67 | 1.21 | 0.32 | 2.83 | 0.90 |
| | (1.00) | (1.00) | (1.00) | (0.97) | (0.77) | (0.74) |
| 0.04 | 0.38 | 4.73 | 1.80 | 0.37 | 3.38 | 1.25 |
| | (1.00) | (1.00) | (1.00) | (0.97) | (0.71) | (0.69) |
| 0.06 | 0.42 | 5.81 | 2.44 | 0.41 | 3.96 | 1.62 |
| | (1.00) | (1.00) | (1.00) | (0.98) | (0.68) | (0.66) |

TABLE 1-continued

| | Conventional DPL 4-2 compressor | | | Proposed 4-2 compressor | | |
|---|---|---|---|---|---|---|
| $C_L$ [pF] | Delay [ns] | Power [μW] | Delay × Power [fJ] | Delay [ns] | Power [μW] | Delay × Power [fJ] |
| 0.08 | 0.46 (1.00) | 6.91 (1.00) | 3.18 (1.00) | 0.45 (0.98) | 4.52 (0.65) | 2.03 (0.64) |
| 0.10 | 0.50 (1.00) | 7.99 (1.00) | 4.00 (1.00) | 0.49 (0.98) | 5.08 (0.64) | 2.49 (0.62) |

TABLE 2

| | Conventional RIC 4-2 compressor | | | Proposed 4-2 compressor | | |
|---|---|---|---|---|---|---|
| $C_L$ [pF] | Delay [ns] | Power [μW] | Delay × Power [fJ] | Delay [ns] | Power [μW] | Delay × Power [fJ] |
| 0.02 | 0.37 (1.00) | 3.91 (1.00) | 1.45 (1.00) | 0.32 (0.86) | 2.83 (0.72) | 0.90 (0.62) |
| 0.04 | 0.42 (1.00) | 5.02 (1.00) | 2.11 (1.00) | 0.37 (0.88) | 3.38 (0.67) | 1.25 (0.59) |
| 0.06 | 0.46 (1.00) | 6.14 (1.00) | 2.82 (1.00) | 0.41 (0.89) | 3.96 (0.64) | 1.62 (0.57) |
| 0.08 | 0.51 (1.00) | 7.22 (1.00) | 3.68 (1.00) | 0.45 (0.88) | 4.52 (0.63) | 2.03 (0.55) |
| 0.10 | 0.55 (1.00) | 8.28 (1.00) | 4.55 (1.00) | 0.49 (0.89) | 5.08 (0.61) | 2.49 (0.55) |

As shown in Table 1, the delay, power consumption, and multiplication result of the delay and the power consumption of the 4-2 compressor 100 are improved, as compared to the DPL 4-2 compressor 20 in FIG. 2. In the 4-2 compressor 100, the delay is improved by about 2–3%, the power consumption is improved by about 23–36% and the multiplication result is improved by about 26–38%, as compared to the DPL 4-2 compressor 20.

As shown in Table 2, the delay, power consumption, and multiplication result of the delay and the power consumption of the 4-2 compressor 100 are improved, as compared to the RIC 4-2 compressor 30 in FIG. 4. In the 4-2 compressor 100, the delay is improved by about 11–14%, the power consumption is improved by about 28–39% and the multiplication result is improved by about 38–45%, as compared to the RIC 4-2 compressor 30.

In this manner, the 4-2 compressor according to the present invention can operate at high speed with low power consumption and small circuit area. While this invention has been particularly shown and described with references to preferred embodiments thereof, it will be understood by those skilled in the art that various changes in form and details may be made herein without departing from the spirit and scope of the invention as defined by the appended claims.

What is claimed is:

1. A 4-2 compressor for generating a sum bit and a carry bit as a result of four input data comprising:

a first logic circuit for performing a NAND operation and a NOR operation of a first input data and a second input data, for generating a first XOR/XNOR operation result of the first input data and the second input data using the NAND operation result and the NOR operation result, and for generating a carry-out bit for a following stage by selecting either the NAND operation result or the NOR operation result in response to a third input data;

a second logic circuit for generating a second XOR/XNOR operation result of the third input data and a fourth input data, and for generating a selection signal by selecting one of an XOR operation result and an XNOR operation result of the first XOR/XNOR operation result from the first logic circuit, in response to the second XOR/XNOR operation result;

a third logic circuit for generating the sum bit by selecting one of a carry-input bit and an inverted carry-input bit in response to the selection signal from the second logic circuit; and a fourth logic circuit for generating the carry bit by selecting one of the inverted carry-input bit and an inverted fourth input data in response to the selection signal from the second logic circuit.

2. The 4-2 compressor according to claim 1, wherein the first logic circuit comprises:

a first XOR/XNOR logic circuit for performing the NAND operation and the NOR operation, respectively, and for generating the first XOR/XNOR operation result by using the NAND operation result and the NOR operation result; and a first multiplexer for generating the carry-out bit for the following stage by selecting either the NAND operation result or the NOR operation result in response to an inverted third input data, wherein the first multiplexer is a single railed multiplexer.

3. The 4-2 compressor according to claim 2, wherein the first XOR/XNOR logic circuit comprises:

a NAND gate for performing the NAND operation of a first input data and a second input data;

a NOR gate for performing the NOR operation of the first input data and the second input data;

an XNOR means for generating an XNOR result of the first input data and the second input data in response to the outputs of the NOR gate and the NAND gate; and an XOR means for generating an XOR result of the first input data and the second input data in response to the outputs of the NOR gate and the NAND gate.

4. The 4-2 compressor according to claim 3, wherein the XNOR means comprises:

a first inverter for inverting the output from the NAND gate while the output of the NOR gate is a first logic state, and outputting the output from the NAND gate without inverting while the output of the NOR gate is a second logic state; and a first full-swing means for making full-swing the output of the first inverter.

5. The 4-2 compressor according to claim 4, wherein the first inverter comprises a P type transistor and a N type transistor having a current path between a power supply voltage source and an output port of the NOR gate in series, and a control electrode controlled by the output of the NAND gate.

6. The 4-2 compressor according to claim 4, wherein the first full-swing means comprises a P type transistor having a current path between an output port of the first inverter and the output port of the NOR gate, and a control electrode controlled by the first input data.

7. The 4-2 compressor according to claim 6, wherein the first full-swing means is turned on when the output signal of the NOR gate is the second logic level, and increases the voltage level of the output signal of the first inverter as high as the power supply voltage level.

8. The 4-2 compressor according to claim 3, wherein the XOR means comprises:

a second inverter for inverting the output from the NOR gate while the output of the NAND gate is the second logic state, and outputting the output from the NAND gate without inverting while the output of the NOR gate is the second logic state; and a second full-swing means for making full-swing the output of the second inverter.

9. The 4-2 compressor according to claim 8, wherein the second inverter comprises a P type transistor and a N type transistor having a current path between a ground voltage source and an output port of the NAND gate in series, and a control electrode controlled by the output of the NOR gate.

10. The 4-2 compressor according to claim 8, wherein the second full-swing means comprises a N type transistor having a current path between an output port of the second inverter and the output port of the NAND gate, and control electrode controlled by the first input data.

11. The 4-2 compressor according to claim 10, wherein the second full-swing means is turned on when the output signal of the NAND gate is the first logic level, and decreases the voltage level of the output signal of the second inverter as low as the ground voltage level.

12. The 4-2 compressor according to claim 1, wherein the second logic circuit comprises:

a second XOR/XNOR logic circuit for performing a NAND operation and a NOR operation of the third input data and fourth input data, and for generating the second XOR/XNOR operation result of the third and fourth input data by using the NAND operation result and the NOR operation result; and a second multiplexer for generating the selection signal by selecting either the XOR operation result or the XNOR operation result from the first logic circuit, in response to the second XOR/XNOR operation result from the second XOR/XNOR logic circuit, wherein the second multiplexer is a dual railed multiplexer.

13. The 4-2 compressor according to claim 12, wherein the second XOR/XNOR logic circuit comprises:

a NAND gate for performing the NAND operation of the third input data and the fourth input data;

a NOR gate for performing the NOR operation of the third input data and the fourth input data;

an XNOR means for generating an XNOR result of the third input data and the fourth input data in response to the outputs of the NOR gate and the NAND gate; and an XOR means for generating an XOR result of the third input data and the fourth input data in response to the outputs of the NOR gate and the NAND gate.

14. The 4-2 compressor according to claim 13, wherein the XNOR means comprises:

a first inverter for inverting the output from the NAND gate while the output of the NOR gate is a first logic state, and outputting the output from the NAND gate without inverting while the output of the NOR gate is a second logic state; and a first full-swing means for making full-swing the output of the first inverter.

15. The 4-2 compressor according to claim 14, wherein the first inverter comprises a P type transistor and a N type transistor having a current path between a power supply voltage source and an output port of the NOR gate in series, and a control electrode controlled by the output of the NAND gate.

16. The 4-2 compressor according to claim 14, wherein the first full-swing means comprises a P type transistor having a current path between an output port of the first inverter and the output port of the NOR gate, and a control electrode controlled by the third input data.

17. The 4-2 compressor according to claim 16, wherein the first full-swing means is turned on when the output signal of the NOR gate is the second logic level, and increases the voltage level of the output signal of the first inverter as high as the power supply voltage level.

18. The 4-2 compressor according to claim 13, wherein the XOR means comprises:

a second inverter for inverting the output from the NOR gate while the output of the NAND gate is the second logic state, and outputting the output from the NAND gate without inverting while the output of the NOR gate is the second logic state; and a second full-swing means for making full-swing the output of the second inverter.

19. The 4-2 compressor according to claim 18, wherein the second inverter comprises a P type transistor and a N type transistor having a current path between a ground voltage source and an output port of the NAND gate in series, and a control electrode controlled by the output of the NOR gate.

20. The 4-2 compressor according to claim 18, wherein the second full-swing means comprises a N type transistor having a current path between an output port of the second inverter and the output port of the NAND gate, and control electrode controlled by the third input data.

21. The 4-2 compressor according to claim 20, wherein the second full-swing means is turned on when the output signal of the NAND gate is the first logic level, and decreases the voltage level of the output signal of the second inverter as low as the ground voltage level.

22. The 4-2 compressor according to claim 1, wherein the third logic circuit comprises a third multiplexer for generating the sum bit, by selecting one of the carry-input bit and the inverted carry-input bit, in response to the selection signal from the second logic circuit, wherein the third multiplexer is a single railed multiplexer.

23. The 4-2 compressor according to claim 1, wherein the fourth logic circuit comprises a fourth multiplexer for generating the carry bit, by selecting one of the inverted fourth input data and the inverted carry-input bit, in response to the selection signal from the second logic circuit, wherein the fourth multiplexer is a single railed multiplexer.

24. A 4-2 compressor for generating a sum bit and a carry bit as a result of four input data comprising:

a first XOR/XNOR logic circuit for performing a NAND operation and a NOR operation of a first input data and a second input data, and for generating a first XOR/XNOR operation result of the first input data and second input data by using the NAND operation result and the NOR operation result;

a first multiplexer for generating the carry-out bit for a following stage by selecting either the NAND operation result or the NOR operation result in response to an inverted third input data, wherein the first multiplexer is a single railed multiplexer;

a second XOR/XNOR logic circuit for performing a NAND operation and a NOR operation of a third input data and fourth input data, and for generating a second XOR/XNOR operation result of the third input data and fourth input data by using the NAND and NOR operation results;

a second multiplexer for generating a selection signal by selecting either the XOR operation result or the XNOR operation result from the first XOR/XNOR logic circuit, in response to the second XOR/XNOR operation result from the second XOR/XNOR logic circuit, wherein the second multiplexer is a dual railed multiplexer;

a third multiplexer for generating the sum bit, by selecting one of a carry-input bit and inverted carry-input bit, in response to the selection signal from the second multiplexer, wherein the third multiplexer is a single railed multiplexer; and a fourth multiplexer for generating the carry bit, by selecting one of an inverted fourth input data and the inverted carry-input bit, in response to the selection signal from the second multiplexer, wherein the fourth multiplexer is a single railed multiplexer.

* * * * *